(12) United States Patent
Wurmfeld

(10) Patent No.: US 11,449,846 B2
(45) Date of Patent: Sep. 20, 2022

(54) PERSONALIZED AUTOMATIC TELLER MACHINE

(71) Applicant: CAPITAL ONE SERVICES, LLC, Mclean, VA (US)

(72) Inventor: David Wurmfeld, Arlington, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 17/100,413

(22) Filed: Nov. 20, 2020

(65) Prior Publication Data

US 2021/0073759 A1    Mar. 11, 2021

Related U.S. Application Data

(63) Continuation of application No. 15/892,392, filed on Feb. 8, 2018, now Pat. No. 10,846,669, which is a continuation of application No. 15/389,313, filed on Dec. 22, 2016.

(60) Provisional application No. 62/387,194, filed on Dec. 24, 2015.

(51) Int. Cl.
| | | |
|---|---|---|
| *G06Q 20/10* | (2012.01) | |
| *G06K 19/07* | (2006.01) | |
| *G07F 19/00* | (2006.01) | |
| *G06Q 20/40* | (2012.01) | |
| *G07G 1/01* | (2006.01) | |

(52) U.S. Cl.
CPC ..... *G06Q 20/1085* (2013.01); *G06K 19/0718* (2013.01); *G06Q 20/40145* (2013.01); *G07F 19/202* (2013.01); *G07F 19/203* (2013.01); *G07F 19/206* (2013.01); *G07G 1/01* (2013.01)

(58) Field of Classification Search
CPC .................................................. G06Q 20/1085
See application file for complete search history.

(56) References Cited

U.S. PATENT DOCUMENTS

| | | |
|---|---|---|
| 6,659,341 B1 | 12/2003 | Wang |
| 7,175,076 B1 | 2/2007 | Block et al. |
| 7,644,039 B1 | 1/2010 | Magee et al. |
| 9,792,594 B1 | 10/2017 | Bayha et al. |
| 2004/0198425 A1 | 10/2004 | Mellone et al. |
| 2009/0192938 A1 | 7/2009 | Amos |
| 2010/0332388 A1 | 12/2010 | Rielly et al. |
| 2011/0040692 A1 | 2/2011 | Ahroon |
| 2011/0118029 A1 | 5/2011 | Lukas et al. |

(Continued)

OTHER PUBLICATIONS

Anonymous, "Products of the year," Network Magazine, San Francisco, vol. 16, Iss. 5 (Year 2001), pp. 14.

*Primary Examiner* — Edward Chang

(74) *Attorney, Agent, or Firm* — Finnegan, Henderson, Farabow, Garrett & Dunner, LLP

(57) ABSTRACT

Computer implemented systems and methods are provided for an automatic teller machine. In some embodiments, an automatic teller machine may comprise a touch-sensitive display, one or more memory devices storing instructions, and one or more processors. The one or more processors may be configured to receive authentication data associated with a user, retrieve user profile information based on the authentication data, determine user interface attributes based on the user profile information; and generate an automatic teller machine interface based on the user profile information.

16 Claims, 8 Drawing Sheets

(56) References Cited

U.S. PATENT DOCUMENTS

| | | |
|---|---|---|
| 2011/0238573 A1* | 9/2011 | Varadarajan ....... G06Q 20/3263 |
| | | 705/43 |
| 2011/0257985 A1 | 10/2011 | Goldstein |
| 2012/0023017 A1 | 1/2012 | Votaw et al. |
| 2012/0032896 A1 | 2/2012 | Vesely et al. |
| 2012/0292388 A1 | 11/2012 | Hernandez |
| 2014/0015779 A1 | 1/2014 | Yang et al. |
| 2014/0231508 A1* | 8/2014 | Lutz ..................... G07F 19/206 |
| | | 235/379 |
| 2015/0058215 A1 | 2/2015 | Johnson |
| 2015/0062018 A1 | 3/2015 | Naidu et al. |
| 2016/0162856 A1 | 6/2016 | Johnson et al. |
| 2016/0371482 A1 | 12/2016 | Suzuki |

* cited by examiner

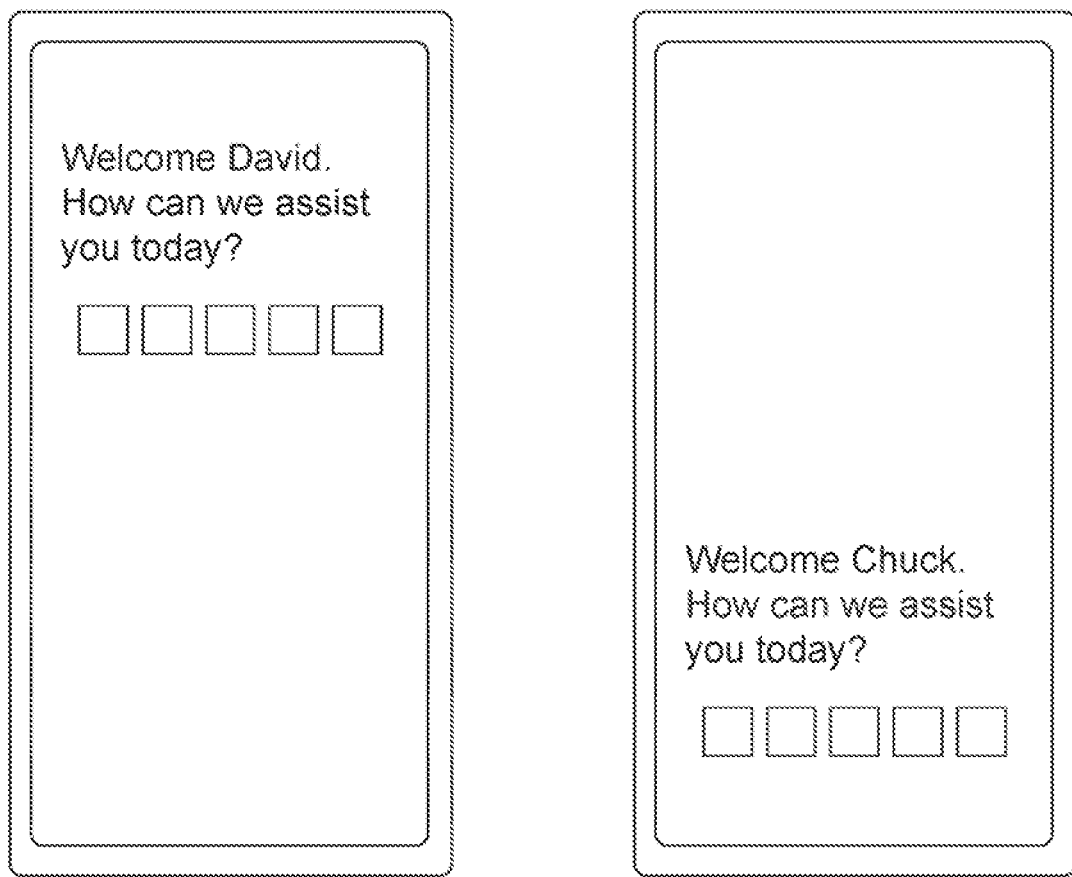

PERSONALIZED AUTOMATIC TELLER MACHINE

PRIORITY CLAIM

This application is a continuation of U.S. patent application Ser. No. 15/892,392, filed on Feb. 8, 2018, which is a continuation of U.S. patent application Ser. No. 15/389,313, filed on Dec. 22, 2016, which claims priority under 35 U.S.C. § 119 to U.S. Provisional Application No. 62/387,194, filed on Dec. 24, 2015, and entitled "Personalized Automatic Teller Machine." The disclosures of the above-referenced applications are expressly incorporated herein by reference in their entireties.

TECHNICAL FIELD

The disclosed embodiments generally relate to improvements to automatic teller machines, and particularly, to improvements to automatic teller machines through hardware and software embodiments facilitating automatic teller machine personalization.

BACKGROUND

The ubiquity of automatic teller machines, or ATMs, has increased substantially in recent decades. While greater availability and improved features have made ATMs more useful in certain ways, numerous limitations in ATM design have remained. Often ATMs are more difficult for some users to operate than for others. For example, ATMs often include a display that can only be viewed from a limited range of viewing angles and lines of sight. This may make operation of the ATM difficult or uncomfortable particularly for users outside of the nominal height range for viewing the ATM display that must strain to operate the machine.

Further, many aspects of ATM design are often fixed and unchangeable when an ATM is in service. Examples include display location button location, button size, hardware for accepting transaction cards or currency, language, color combination, and placement of signs and instructions. Such aspects may be configured optimally for some users, but due to their fixed nature may render ATM use inconvenient or impossible for other users.

Further, the attachment of unauthorized devices to ATMs by thieves is a growing problem due to the increasing complexity of ATM designs providing numerous locations for attaching such devices. Such devices can be difficult and expensive to detect, and if undetected, may reduce the effectiveness or negate entirely ATM features intended to protect users from fraud or theft.

In view of the shortcomings of current. ATM systems, improved ATM designs are desired.

SUMMARY

Disclosed embodiments provide methods and systems for proved ATM interfaces. Disclosed embodiments improve upon disadvantages of conventional ATM technologies, for example by providing personalization and/or configurability, allowing an ATM to adapt to various users' physical characteristics, abilities, and/or preferences. Accordingly, where traditional ATMs may be more convenient or user friendly for certain users, and less so for others, disclosed embodiments provide improved functionality and ease of use across a wider variety of users by customizing the ATM to individual users.

Such personalization may improve ergonomic properties of the ATM, improve speed and/or accuracy of user interactions with the ATM, and/or reduce inefficiency attributable to inaccurate user interaction with the ATM. Personalization may also improve accessibility for users with disabilities. Other improvements will also be apparent to those skilled in the art.

Consistent with a disclosed embodiment, an automatic teller machine is provided. The automatic teller machine may include a touch-sensitive display, one or more memory devices storing instructions, and one or more processors. The one or more processors may be configured to execute the instructions to perform operations. The operations may include receiving, from a user device, authentication data associated with a user. The operations may also include retrieving, over a network, user profile information based on the authentication data determine user interface attributes based on the user profile information. The operations may also include generating an automatic teller machine interface based on the user profile information.

Consistent with another disclosed embodiment, a computer-implemented method for displaying an ATM interface is provided. The method may comprise receiving, from a user device, authentication data associated with a user. The method may also include retrieving, over a network, user profile information based on the authentication data determining user interface attributes based on the user profile information. The method may further include generating an automatic teller machine interface based on the user profile information.

Consistent with other disclosed embodiments, non-transitory computer-readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIGS. 6A, 6B, 7A, 7B, 8A, and 8B are examples of ATM interfaces, consistent with disclosed embodiments.

DETAILED DESCRIPTION

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
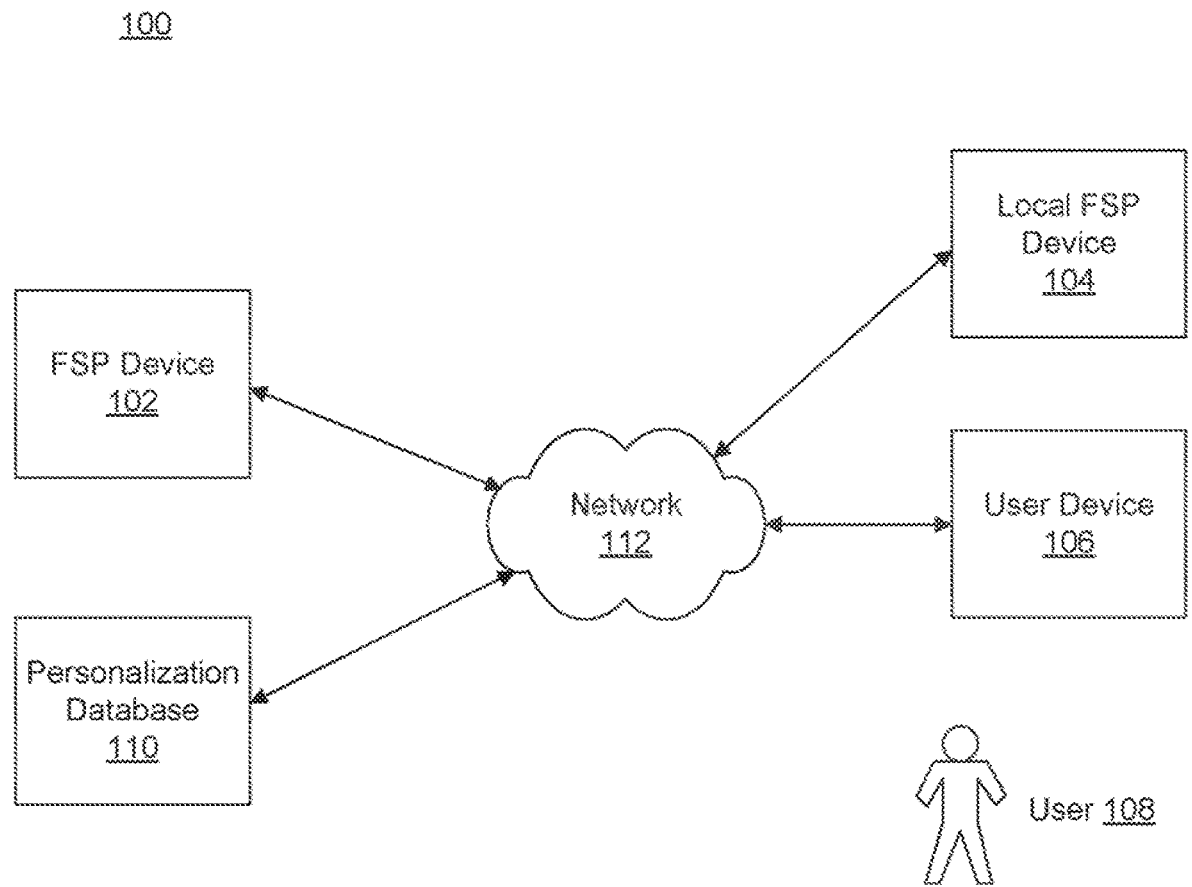
FIG. 1 is a diagram of an exemplary system, consistent with disclosed embodiments.

FIG. 1 shows a diagram of an exemplary system 100, consistent with disclosed embodiments. As shown in FIG. 1, system 100 may include a financial service provider device 102, a local financial service provider device 104, a user device 106, a personalization database 110, and a network 112 to facilitate communication among the components of system 100. The components and arrangement of the components included in system 100 may vary. Thus, system 100 may further include other components that perform or assist in the performance of one or more processes consistent with the disclosed embodiments. The components and arrangements shown in FIG. 1 are not intended to limit the disclosed embodiments, as the components used to implement the disclosed processes and features may vary.

In accordance with disclosed embodiments, system 100 may include a financial service provider (FSP) device 102. FSP device 102 may be a system associated with a financial service provider (not shown), such as a bank, a credit card company, a lender, brokerage firm, or any other type of financial service entity that generates, provides, manages, maintains financial service accounts, etc. for one or more users. FSP device 102 may be one or more computing systems that are configured to execute software instructions stored on one or more memory devices to perform one or more operations consistent with the disclosed embodiments. For example, FSP device 102 may include one or more memory device(s) storing data and software instructions and one or more processor(s) configured to use the data and execute the software instructions to perform server-based functions and operations known to those skilled in the art. FSP device 102 may include one or more general purpose computers, mainframe computers, or any combination of these types of components.

In certain embodiments, FSP device 102 may be configured as a particular apparatus, system, and the like based on the storage, execution, and/or implementation of the software instructions that perform one or more operations consistent with the disclosed embodiments. FSP device 102 may be standalone, or it may be part of a subsystem, which may be part of a larger system. For example, FSP device 102 may represent distributed servers that are remotely located and communicate over a network (e.g., network 112) or a dedicated network, such as a LAN, for a financial service provider. An exemplary computing system consistent with FSP device 102 is discussed in additional detail with respect to FIG. 2, below.

FSP device 102 may include or may access one or more storage devices configured to store data and/or software instructions used by one or more processors of FSP device 102 to perform operations consistent with disclosed embodiments. For example, FSP device 102 may include memory 230 configured to store one or more software programs that performs several functions when executed by a processor. The disclosed embodiments are not limited to separate programs or computers configured to perform dedicated tasks. For example, FSP device 102 may include memory that stores a single program or multiple programs. Additionally, FSP device 102 may execute one or more programs located remotely from FSP device 102. For example, FSP device 102 may access one or more remote programs stored in memory included with a remote component that, when executed, perform operations consistent with the disclosed embodiments. In certain aspects, FSP device 102 may include server software that generates, maintains, and provides services associated with financial account management. In other aspects, FSP device 102 may connect separate server(s) or similar computing devices that generate, maintain, and provide services associated with financial data for a financial service provider associated with FSP device 102.

System 100 may also include one or more local FSP devices 104. Local FSP devices may include, for example, Automatic Teller Machines ("ATMs") or detection devices in local FSP branches or other locations (e.g., retail locations, gas stations, etc.). Local FSP device 104 may include one or more memory device(s) that store data that may be used for performing one or more processes consistent with the disclosed embodiments. In certain aspects, local FSP device 104 may additionally, or alternatively, include one or more computer devices. For example, local FSP device 104 may include one or more memory device(s) storing data and software instructions and one or more processor(s) configured to use the data and execute the software instructions to perform computing functions and operations known to those skilled in the art.

Local FSP device 104 may further include computer device(s) that are configured to execute stored software instructions to perform operations associated with collecting, storing, and accessing biometric data, including one or more processes associated with gathering biometric data from a variety of sources, compiling the data, and organizing the data into easily accessible profiles. Local FSP device 104 may include one or more computer device(s) that may be a general purpose computer, server, mainframe computer, or any combination of these components. In certain embodiments, local FSP device 104 (or a system including local FSP device 104) may be configured as a particular apparatus, system, and the like based on the storage, execution, and/or implementation of the software instructions that perform one or more operations consistent with the disclosed embodiments. A local FSP device 104 may be standalone, or it may be part of a subsystem, which may be part of a larger system. For example, local FSP device 104 may represent distributed servers that are remotely located and communicate over a network (e.g., network 112) or a dedicated network, such as a LAN. An exemplary computer system consistent with local FSP device 104 is discussed in additional detail with respect to FIG. 2. In certain embodiments, a third party may operate the components associated with local FSP device 104. Additionally or alternatively, local FSP device 104 may be a part or subpart of FSP device 102.

System 100 may further include one or more user devices 106. A user 108 may operate a user device 106, which may be a desktop computer, laptop, tablet, smartphone, multi-functional watch, pair of multifunctional glasses, tracking device, chip-enabled payment card, or any suitable device with computing capability. User device 106 may include one or more processor(s) and memory device(s) known to those skilled in the art. For example, user device 106 may include memory device(s) that store data and software instructions that, when executed by one or more processor(s), perform operations consistent with the disclosed embodiments. In one aspect, user device 106 may have a financial application installed thereon, which may enable user device 106 to communicate with FSP device 102 and/or local FSP device 104 via network 112. For instance, user device 106 may be a smartphone or tablet (or the like) that executes a stored mobile application that performs online banking operations. In other embodiments, user device 106 may connect to FSP device 102 and/or local FSP device 104 through use of browser software stored and executed by user device 106. User device 106 may be configured to execute software instructions to allow a user to access information stored in FSP device 102 such as, for example, financial information related to purchase transactions, financial statements, account information, rewards program information and the like. Additionally, user device 106 may be configured to execute software instructions that initiate and conduct transactions with FSP device 102 or local FSP device 104, such as, for example, ATM withdrawals, wire transfers, debit card PIN resets, and call center transactions. An exemplary computer system consistent with user device 106 is discussed in additional detail with respect to FIG. 2.

User 108 may operate user device 106 to perform one or more operations consistent with the disclosed embodiments. In one aspect, user 108 may be a customer of a financial service provider associated with FSP device 102. For instance, a financial service provider may maintain a financial service account (e.g., checking account, savings account, debit card account, or credit card account) for user 108 that the user may use to purchase goods and/or services. Additionally or alternatively, user 108 may use user device 106 and the financial service account (for example, through a mobile application installed on user device 106) to withdraw cash from an ATM (such as local FSP device 104), contact a customer call center, transfer or wire money, or reset their debit account PIN.

User 108 may further operate user device 106 in order to be detected and recognized by local FSP device 104. For example, user device 106 may detect, through the user of network 112, a local FSP device 104 in its immediate proximity. Additionally or alternatively, local FSP device 104 may detect user device 106 in its immediate proximity. User device 106 may then connect to local FSP device 104 in order to initiate, conduct, or complete a financial transaction.

System 100 may also include one or more personalization databases 110. Personalization database 110 may include one or more memory device(s) that store data that may be used for performing one or more processes consistent with the disclosed embodiment. In certain aspects, personalization database 110 may additionally, or alternatively, include one or more servers or other type of computer devices. The personalization database 110 server(s) may be one or more computing devices configured to execute software instructions stored in memory to perform one or more processes consistent with the disclosed embodiments. For example, personalization database 110 may include one or more memory device(s) storing data and software instructions and one or more processor(s) configured to use the data and execute the software instructions to perform server-based functions and operations known to those skilled in the art.

Personalization database 110 may further include server(s) that are configured to execute stored software instructions to perform operations associated with collecting, storing, and accessing profile data related to user 108, including one or more processes associated with gathering, for example, data related to user 108's demographics, accessibility needs, display preferences, and biometrics information. Personalization database 110 may gather the data from a variety of sources, compile the data, and organize the data into easily accessible profiles. Personalization database 110 may include one or more servers that may be a general purpose computer, mainframe computer, or any combination of these components. In certain embodiments, Personalization database 110 (or a system including personalization database 110) may be configured as a particular apparatus, system, and the like based on the storage, execution, and/or implementation of the software instructions that perform one or more operations consistent with the disclosed embodiments. A personalization database 110 may be standalone, or it may be part of a subsystem, which may be part of a larger system. For example, personalization database 110 may represent distributed servers that are remotely located and communicate over a network (e.g. network 112) or a dedicated network, such as a LAN. An exemplary computer system consistent with personalization database 110 is discussed in additional detail with respect to FIG. 2.

In certain embodiments, personalization database 110 may be associated with an entity, such as a company, organization, agency, etc. In one embodiment, the personalization database entity may be a different entity than a financial service provider associated with FSP device 102. In certain aspects, a user or user(s) affiliated with a personalization database entity may operate one or more components associated with personalization database 110 to collect and maintain personalization data. In other embodiments, personalization database 110 may be associated with a financial service provider or other entity associated with FSP device 102. For example, personalization database 110 may be a part or subpart of FSP device 102.

Network 112 may comprise any type of computer networking arrangement used to exchange data. For example, network 112 may be the Internet, a private data network, a virtual private network using a public network, a WiFi network, a LAN or WAN network, and/or other suitable connections that may enable information exchange among various components of the system 100. Network 112 may also include a public switched telephone network ("PSTN") and/or a wireless cellular network. Network 112 may be a secured network or unsecured network. In other embodiments, one or more components of system 100 may communicate directly through a dedicated communication link(s), such as links between user device 106, FSP device 102, local FSP device 104, and personalization database 110.

Additionally or alternatively, network 112 may include a direct communication network. Direct communications may use any suitable technologies, including, for example, Bluetooth™, Bluetooth LE™ (BLE), WiFi, near field communications (NFC), or other suitable communication methods that provide a medium for transmitting data between separate devices. In certain embodiments, user device 106 and local FSP device 104 may connect and communicate through a direct communications network, for example, based on any of the above networking technologies.

Other components known to one of ordinary skill in the art may be included in system 100 to process, transmit, provide, and receive information consistent with the disclosed embodiments.

Figure 2:
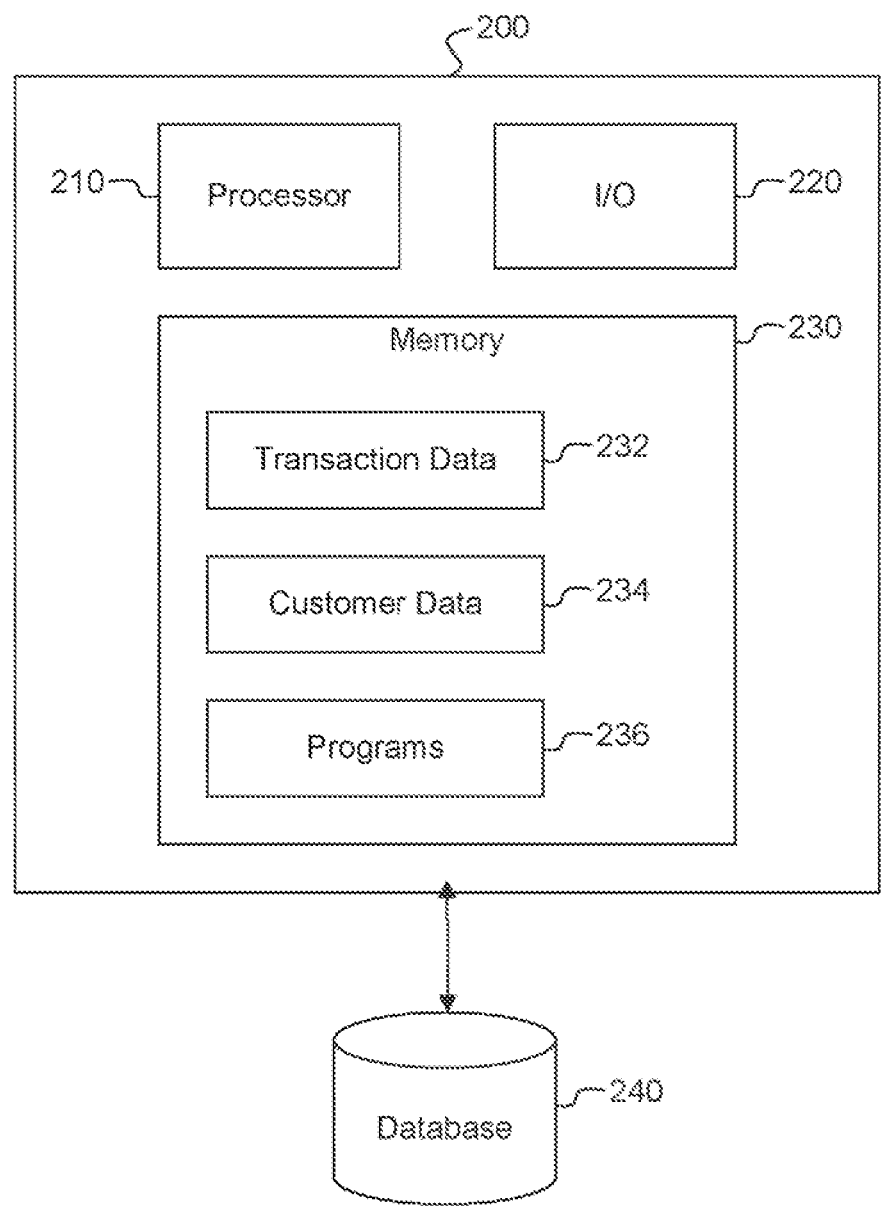
FIG. 2 is a diagram of an exemplary computer system, consistent with disclosed embodiments.

FIG. 2 shows a diagram of an exemplary computing system 200 illustrating a computing system configuration that may be associated with FSP device 102, local FSP device 104, user device 106, and/or personalization device 110, consistent with disclosed embodiments. In one embodiment, computing system 200 may have one or more processors 210, one or more memories 230, and one or more input/output (I/O) devices 220. In some embodiments computing system 200 may take the form of a server, general purpose computer, a mainframe computer, laptop, smartphone, mobile device, or any combination of these components. In certain embodiments, computing system 200 (or a system including computing system 200) may be configured as a particular apparatus, system, and the like based on the storage, execution, and/or implementation of the software instructions that perform one or more operations consistent with the disclosed embodiments. Computing system 200 may be standalone, or it may be part of a subsystem, which may be part of a larger system.

Processor 210 may include one or more known processing devices, such as a microprocessor from the Pentium™ or Xeon™ family manufactured by Intel™, the Turion™ family manufactured by AMD™, or any of various processors manufactured by Sun Microsystems. Processor 210 may constitute a single core or multiple core processor that executes parallel processes simultaneously. For example, processor 210 may be a single core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc. multiple software processes, applications, programs, etc. In another embodiment, processor 210 may include a multiple-core processor arrangement (e.g., dual, quad core, etc.) configured to provide parallel processing functionalities to allow computing system 200 to execute multiple processes simultaneously. One of ordinary skill in the art would understand that other types of processor arrangements could be implemented that provide for the capabilities disclosed herein. The disclosed embodiments are not limited to any type of processor(s) configured in computing system 200.

Memory 230 may include one or more storage devices configured to store instructions used by processor 210 to perform functions related to the disclosed embodiments. For example, memory 230 may be configured with one or more software instructions, such as program(s) 236 that may perform one or more operations when executed by processor 210. The disclosed embodiments are not limited to separate programs or computers configured to perform dedicated tasks. For example, memory 230 may include a program 236 that performs the functions of computing system 200, or program 236 could comprise multiple programs. Additionally, processor 210 may execute one or more programs located remotely from computing system 200. For example, FSP device 102, local FSP device 104, user device 106, or personalization database 110, may, via computing system 200 (or variants thereof), access one or more remote programs that, when executed, perform functions related to certain disclosed embodiments. Processor 210 may further execute one or more programs located in database 240. In some embodiments, programs 236 may be stored in an external storage device, such as a cloud server located outside of computing system 200, and processor 210 may execute programs 236 remotely.

Programs executed by processor 210 may cause processor 210 to execute one or more processes related to financial services provided to users including, but not limited to, processing credit and debit card transactions, checking transactions, fund deposits and withdrawals, transferring money between financial accounts, lending loans, processing payments for credit card and loan accounts, processing orders for certified funds, processing orders for new or reissue debit cards, and processing ATM cash withdrawals.

Memory 230 may also store data that may reflect any type of information in any format that the system may use to perform operations consistent with the disclosed embodiments. Memory 230 may store instructions to enable processor 210 to execute one or more applications, such as server applications, network communication processes, and any other type of application or software. Alternatively, the instructions, application programs, etc., may be stored in an external storage (not shown) in communication with computing system 200 via network 112 or any other suitable network. Memory 230 may be a volatile or non-volatile, magnetic, semiconductor, tape, optical, removable, non-removable, or other type of storage device or tangible (i.e., non-transitory) computer-readable medium.

Memory 230 may include transaction data 232. Transaction data 232 may include information related to financial transactions initiated by a user. For example, transaction data may include a user identifier and a transaction type. The user identifier may be a credit or debit card number, and account number, or another means for identifying the user initiating the financial transaction. The transaction type may include an indicator of the type of transaction the user is initiating, such as, ATM cash withdrawal, debit PIN reset, money wire or transfer, call to the customer service center, ordering a new or reissue debit card, ordering certified funds, or other transactions requiring user authentication. Transaction data 232 may also include authentication data obtained from the user for the purposes of authorizing the transaction by verifying the authenticity of provided biometric data as compared to stored biometric data. Additionally or alternatively, transaction data 232 may be stored in database 240 or in an external storage (not shown) in communication with computing system 200 via network 112 or any other suitable network.

Memory 230 may further include customer data 234. Customer data 234 may include information about particular customers of the financial service provider. For example, customer data 234 may include clients' account information, debit or credit card information, history of purchase transactions, financial statements, credit score, risk profile, username and password, debit card PIN, home and work locations, and/or biometric information. Additionally, customer data 234 may include user device identification information, such as, for example, a phone number, email address, IP address, Bluetooth signature, or other device identifier. Alternatively customer data 234 may be stored in database 240, or in an external storage (not shown) or in personalization database 110 in communication with computing system 200 via network 112 or any other suitable network.

Processor 210 may analyze transaction data 232 in reference to customer data 234. For example, processor 210 may analyze transaction data to determine which client with information stored in customer data 234 is initiating the financial transaction. Processor 210 may access the particular user's customer information to determine their account information, debit or credit card information, history of purchase transactions, financial statements, credit score, risk profile, username and password, debit card PIN, home and work locations, and/or authentication data.

I/O devices 220 may be one or more device that is configured to allow data to be received and/or transmitted by computing system 200. I/O devices 220 may include one or more digital and/or analog communication devices that allow computing system 200 to communicate with other machines and devices, such as other components of system 100 shown in FIG. 1. For example, computing system 200 may include interface components, which may provide interfaces to one or more input devices, such as one or more keyboards, mouse devices, displays, touch sensors, card readers, biometric readers, cameras, scanners, microphones, wireless communications devices, and the like, which may enable computing system 200 to receive input from an operator of local FSP device 102, such as user 108.

Computing system 200 may also contain one or more database(s) 240. Alternatively, computing system 200 may be communicatively connected to one or more database(s) 240. Computing system 200 may be communicatively connected to database(s) 240 through network 112. Database 240 may include one or more memory devices that store information and are accessed and/or managed through computing system 200. By way of example, database(s) 240 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. Database 240 may include computing components (e.g., database management system, database server, etc.) configured to receive and process requests for data stored in memory devices of database(s) 240 and to provide data from database 240.

As discussed above, local FSP device 104 may include at least one computing system 200. Further, although sometimes discussed here in relation to local FSP device 104, it should be understood that variations of computing system 200 may be used by other components of system 100, including FSP device 102 user device 106, and personalization database 110. Computing system 200 may be a stand-alone device or server or may be configured as a distributed computer system including multiple servers or computers that interoperate to perform one or more of the processes and functionalities associated with the disclosed embodiments.

Figure 3:
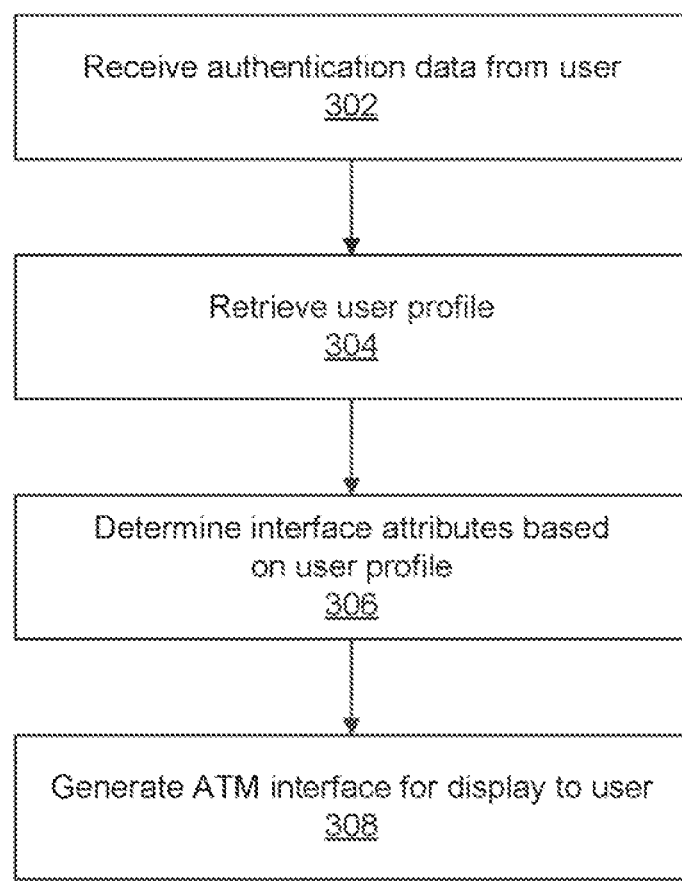
FIG. 3 is a flowchart of an exemplary process for ATM personalization, consistent with disclosed embodiments.

FIG. 3 shows an exemplary ATM personalization process, consistent with disclosed embodiments. Process 300 may be performed by processor 210 of, for example, local FSP device 104 executing instructions encoded on a computer-readable medium storage device for providing ATM functionality. It is to be understood, however, that one or more steps of process 300 may be implemented by other components of system 100 (shown or not shown), including, FSP device 102 and/or user device 108.

At step 302, local FSP device 104 may receive authentication data from a user. Authentication data may be identifying information such as an account number, personal identification number (PIN), social security number, biometric information etc. As an example, user 108 may insert a transaction card such as a credit, debit, or ATM card into a card reader (not shown) connected to local FSP device 104 in order to identify user 108's association with a financial service provider. FSP device 104 may also receive a fingerprint, iris scan, or voice sample provided to a sensor in communication with local FSP device 104. Alternatively, FSP device 104 may receive authentication via a wired or wireless connection with user device 106.

Figure 4:
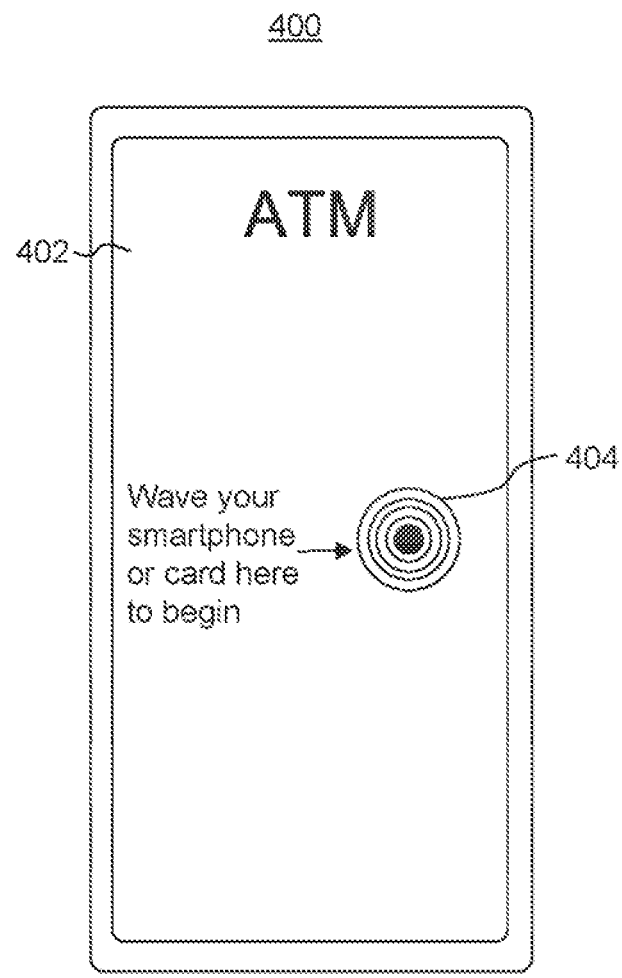
FIG. 4 is a diagram of a portion of an exemplary ATM interface, consistent with disclosed embodiments.

FIG. 4 shows ATM 400, an example of an embodiment of local FSP device 104. ATM 400 may include a touch-sensitive display 402. Display 402 may comprise any size or form factor display based on any display technology, such as LCD, CRT, plasma, OLED, etc. As an example, FIG. 4 depicts display 402 as a 78" diagonal OLED display. As shown in FIG. 4, display 402 may be oriented vertically such that the display is taller than it is wide. Display 402 may be mounted flush with a wall or other surface or behind a glass barrier (not shown) such that unauthorized devices may be more difficult to attach to ATM 400 and/or more easily detected.

As shown in FIG. 4, ATM 400 may display an interface via display 402, requesting authorization data from user 108. ATM 400 may display a graphical element such as a target 404, indicating a portion of display 402, that is enabled to, or is in proximity to a device enabled to connect to user device 106. User 108 may position user device 106 close to target 404, initiating a wireless connection between user device 106 and ATM 400, in which ATM 400 may receive user 108's authorization data.

Referring back to FIG. 3, at step 304, local FSP device 104 may retrieve user profile 304. For example, local FSP device 104 may communicate with personalization database 110 and/or FSP device 102, over network 112, to request user profile 304. Alternatively, user profile 304 may be received from user device 106.

Figure 5:
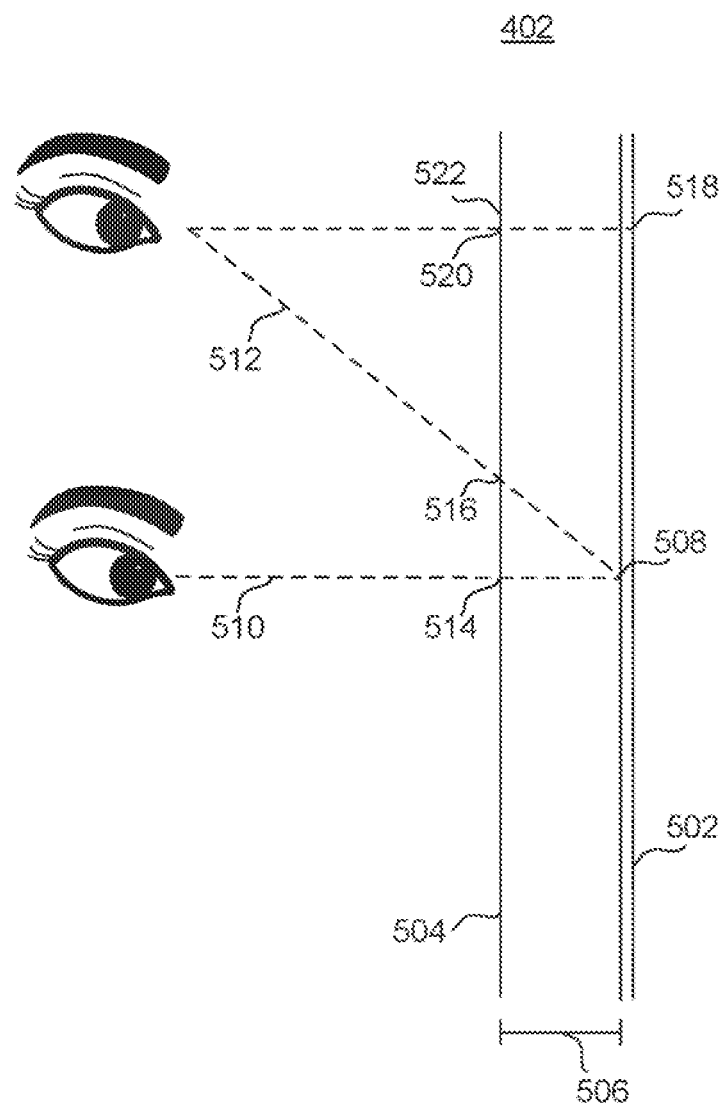
FIG. 5 is a cross sectional diagram of an ATM display, consistent with disclosed embodiments.

At step 306, local FSP device 104 may determine interface attributes based on the retrieved user profile. The determined attributes may vary widely, and may be based on any number of attributes or preferences of user 108. For example, FIG. 5 shows a side view cross section of display 402. As shown in FIG. 5, display 402 may include a display panel 502 behind a layer of glass 504 of a given thickness 506. Glass 504 may be touch sensitive based on, for example, capacitive sensing technology. Based on the retrieved user profile information, specifically information related to the height of user 108, local FSP device 104 may determine that user 108 is likely to view an interface element displayed at location 508 of display 402 along line of sight 510. As a result, the interface element may be visible to user 108 at location 514 of glass 504. Accordingly, local FSP device 104 may determine that touch sensor data indicating an interaction at or near location 514 will be interpreted as a selection of the interface element displayed at location 508.

Alternatively, the retrieved user profile information may indicate that user 108 is taller, and is likely to view an interface element displayed at location 508 of display 402 along line of sight 512. In this case, the interface element may be visible to user 108 at location 516 of glass 504. Accordingly, local FSP device 104 may determine that touch sensor data indicating an interaction at or near location 516 will be interpreted as a selection of the interface element displayed at location 508.

In an embodiment, local FSP device may be configured to arrange interface elements to be displayed on display 402 based on the retrieved user profile information. For example, local FSP device 104 may determine, based on height information included in the user profile information, that the interface element will be displayed at location 518 instead of location 508, such that when viewed along line of sight 520, the interface element will be visible at location 522. Thus, the height of interface elements of an ATM interface may be set in order to display the interface elements at "eye level" for user 108. Further examples of this principle are shown in FIGS. 6A and 6B.

Referring back to FIG. 3, at step 308, local FSP device 104 may generate an ATM interface for display to user 108, based on the determined interface attributes.

FIGS. 6A and 6B show examples of interfaces that may displayed via display 402 of ATM 400 and include attributes determined based on the user profile. FIG. 6A shows an example of an interface that may be generated based on user profile information associated with user 108 that indicates user 108 is of above average height. As shown in FIG. 6A, ATM 400 may further determine a portion of display 402 to remain unused. For example, ATM 400 may generate an interface that occupies only a portion of display 402, based on the portion of the display likely to be within convenient reach and/or view based on user 108's user profile information. Alternatively, space outside user 108's reach or view may be used to display a background image, such as a patterned wallpaper, the logo of the financial service provider associated with ATM 400, or the like.

FIG. 6B shows an example of an interface that may be displayed based on user profile information that indicates that user 108 is of below average height, wherein the interface occupies a lower portion of display 402.

Figure 7A:
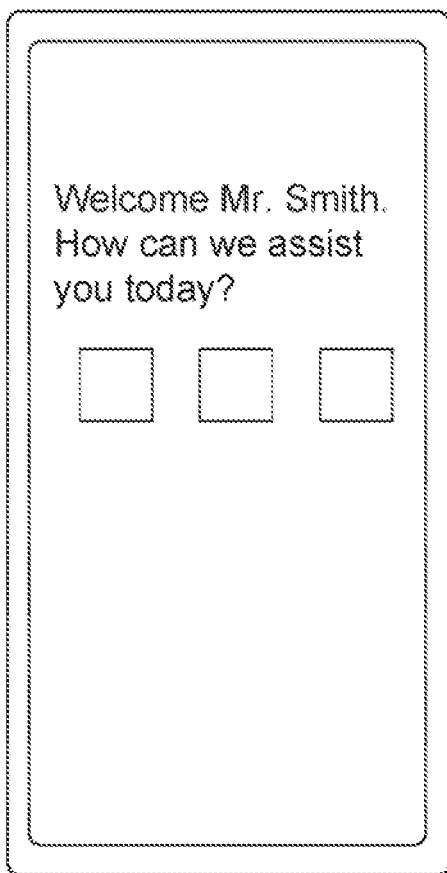

In some embodiments, display 402 may be disposed such that the lowest possible height for display of an interface is at least within specifications set by regulations such as the Americans with Disabilities Act (ADA). Further, user profile information may include information related to abilities or disabilities of user 108. For example, ATM 400 may determine that an ATM interface should be displayed at a height appropriate for an individual in a wheelchair based on user profile information indicating that user 108 uses a wheelchair. User profile information may also include information related to visual ability, hearing ability, or motor skills. Thus, ATM 400 may determine that an ATM interface will display interface elements such as buttons, text, or images (as shown in FIG. 7A) of a particular size or contrast, or favor or avoid certain colors, patterns, or animations due to eye conditions or colorblindness. As another example, user 108 may have difficulty with touch based input devices, and thus have a tendency to select multiple interface elements inadvertently. This tendency may be included in user 108's profile information, and ATM 400 may, as a result, generate an ATM interface that ignores repeated inputs in a short period of time. As a further example, user 108's profile information may include information indicating that user 108 has a hearing disability. Based on this information, ATM 400 may generate an interface that includes amplified or adapted audio, favors visual cues over audio, incorporates Telecommunications Devices for the Deaf (TTD) services, etc. Additionally or alternatively, user 108's profile information may include an indication that user 108 uses a hearing device such as a hearing aid or an implant such as those distributed by Cochlear Ltd. ATM 400 may automatically pair with a Bluetooth or other wireless audio feature included in such devices based on information included in user profile information.

Figure 7B:
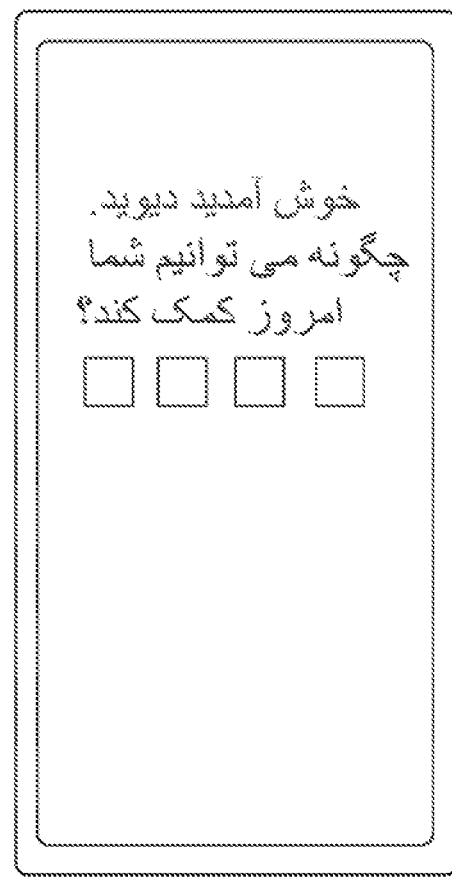

As shown in FIG. 7B, ATM 400 may also automatically display an interface in user 108's preferred language based on received user profile information.

Retrieved user profile information may include information related to services in which user 108 is enrolled. For example, user 108 may be an account holder of a financial account that accepts checks or other written instruments for deposits and/or payments. Based on retrieved user profile information, ATM 400 may request that user 108 present such a payment instrument. The payment instrument may be accepted at ATM 400 in a variety of ways such as via a slot or an image capture device (e.g., a scanner or camera), and instructions for presenting payment may be adapted based on other aspects of user 108's user profile information.

Figure 8A:
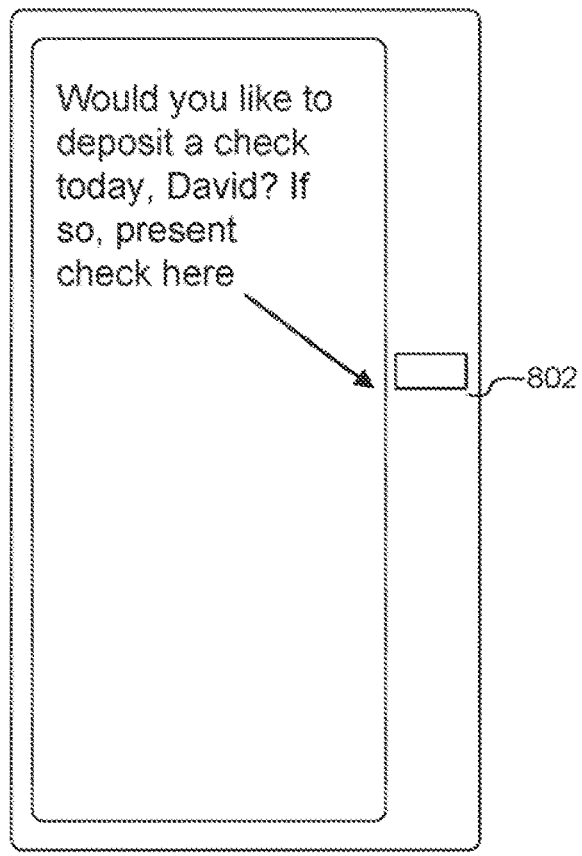
Figure 8B:
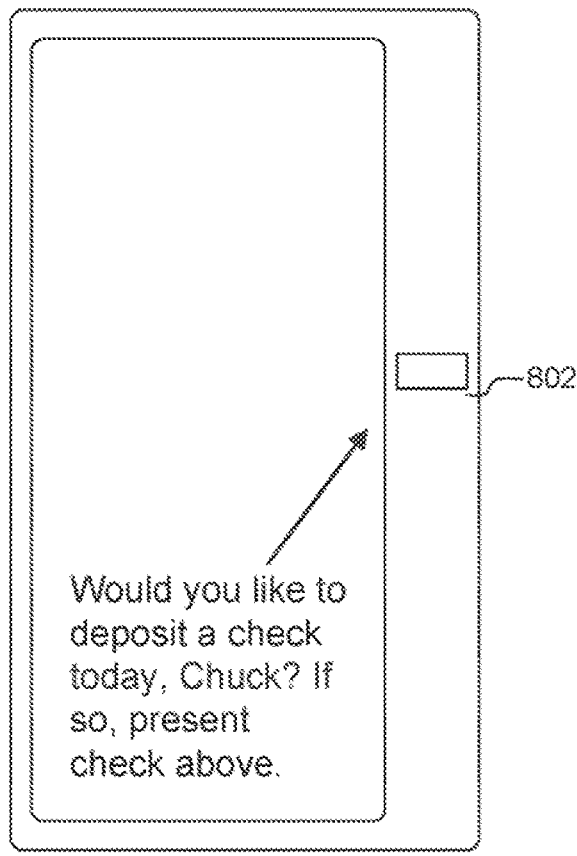

As an example, as shown in FIGS. 8A and 8B, ATM 400 may display an interface requesting presentation of a check for deposit into a financial account. The interface may direct user 108 to the location of the slot, camera, scanner, etc. based on any of the attributes described above. For example, ATM 400 may accept deposits using a camera 802 disposed in proximity with display 402. Camera 802 may capture information from a payment instrument necessary for completing payments and/or deposits. In some embodiments camera 802 may be disposed behind a common transparent surface with display 402. Camera 802 may be identified by a visual identifier, visible on the transparent surface in the shape of a check, as shown in FIGS. 8A and 8B. ATM 400 may capture data from a check placed against the transparent surface within the boundaries of the visual identifier. Based on user profile information indicating that user 108 is of above average height, ATM 400 may display the interface shown in FIG. 8A, which directs user 108's attention down to camera 802. Alternatively, based on user profile information indicating that user 108 is of below average height, ATM 400 may display the interface shown in FIG. 8B, which directs user 108's attention up to camera 802. In some embodiments, ATM 400 may be configured to adjust the physical location of camera 802, and any identifier corresponding to camera 802, within ATM 400 based on the user profile information, and the interface may direct user 108 to the adjusted physical location of camera 802. In some embodiments, camera 802 may be configured to capture payment instrument information from anywhere within an area in front of ATM 400. In such embodiments, ATM 400 may display an interface requesting user 108 to display the payment instrument, at any location, such that the payment instrument faces ATM 400.

In some examples, some or all of the logic for the above-described techniques may be implemented as a computer program or application or as a plug in module or sub component of another application. The described techniques may be varied and are not limited to the examples or descriptions provided. In some examples applications may be developed for download to mobile communications and computing devices, e.g., laptops, mobile computers, tablet computers, smart phones, etc., being made available for download by the user either directly from the device or through a website.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, while a financial service provider has been described herein as the entity detecting and identifying customers, it is to be understood that consistent with disclosed embodiments another entity may provide such services in conjunction with or separate from a financial service provider.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

What is claimed is:

1. A system, comprising:
a touch-sensitive display;
one or more memory devices storing instructions; and
one or more processors configured to execute the instructions to:
receive, from a user device, authentication data comprising biometric data associated with a user;
retrieve, over a network, user profile information based on the biometric data, the user profile information indicating at least one physical trait of the user, wherein the at least one physical trait of the user comprises an indication of a height of the user;
determine user interface attributes based on the user profile information,
wherein determining the user interface attributes includes:
assigning touch input locations on the touch-sensitive display based on the indication of a height of the user, and
identifying, with a biometric camera, an eye level for the user based on the retrieved user height; and
generate an automatic teller machine interface on the touch-sensitive display based on the user profile information and based on the identified user eye level.

2. The system of claim 1, wherein determining the user interface attributes includes assigning a language of the automatic teller machine interface based on the user profile information.

3. The system of claim 1, wherein determining the user interface attributes includes determining a portion of the touch-sensitive display that will be unused by the automatic teller machine interface.

4. The system of claim 3, wherein the unused portion of the touch-sensitive display is determined based on a portion of the display outside one or more of the user's reach or view based on the user profile information.

5. The system of claim 1, wherein determining the user interface attributes includes assigning at least one of text size, interface element size, or interface element color based on the user profile information.

6. The system of claim 1, wherein the system further includes an image capture device, and wherein the one or more processors are further configured to direct the user to present a payment instrument to the image capture device based on the user profile information.

7. The system of claim 1, wherein the at least one physical trait of the user further comprises an indication of a visual impairment of the user, and wherein determining the user interface attributes includes assigning at least one of text size, interface element size, or interface element color based on the indication of a visual impairment of the user.

8. The system of claim 1, wherein the at least one physical trait of the user further comprises an indication of a difficulty of the user in using the touch-sensitive display, and wherein determining the user interface attributes includes ignoring repeated inputs by the user within a predetermined period of time.

9. A method for displaying an automatic teller machine interface, the method comprising the following operations performed by one or more processors:
receiving, from a user device, authentication data comprising biometric data associated with a user;
retrieving, over a network, user profile information based on the biometric data, the user profile information indicating at least one physical trait of the user, wherein the at least one physical trait of the user comprises an indication of a height of the user;
determining user interface attributes based on the user profile information, wherein determining the user interface attributes includes:
assigning touch input locations on a touch-sensitive display based on the indication of a height of the user, and
identifying, with a biometric camera, an eye level for the user based on the retrieved user height; and
generating an automatic teller machine interface on the touch-sensitive display based on the user profile information and based on the identified user eye level.

10. The method of claim 9, wherein determining the user interface attributes includes assigning a language of the automatic teller machine interface based on the user profile information.

11. The method of claim 9, wherein determining the user interface attributes includes determining a portion of the touch-sensitive display that will be unused by the automatic teller machine interface.

12. The method of claim 11, wherein the unused portion of the touch-sensitive display is determined based on a portion of the display outside one or more of the user's reach or view based on the user profile information.

13. The method of claim 9, wherein determining the user interface attributes includes assigning at least one of text size, interface element size, or interface element color based on the user profile information.

14. The method of claim 9, wherein the automatic teller machine interface is configured to direct the user to present a payment instrument to an image capture device based on the user profile information.

15. The method of claim 9, wherein the at least one physical trait of the user further comprises an indication of a visual impairment of the user, and wherein determining the user interface attributes includes assigning at least one of text size, interface element size, or interface element color based on the indication of a visual impairment of the user.

16. The method of claim 9, wherein the at least one physical trait of the user further comprises an indication of a difficulty of the user in using the touch-sensitive display, and wherein determining the user interface attributes includes ignoring repeated inputs by the user within a predetermined period of time.

* * * * *